United States Patent
Fawcett et al.

(10) Patent No.: US 7,069,239 B2
(45) Date of Patent: Jun. 27, 2006

(54) SYSTEM AND METHOD FOR TRACKING TRAILERS

(75) Inventors: David C. Fawcett, Kirkland, WA (US); Pamela R. Schneider, Kent, WA (US)

(73) Assignee: Nintendo of America Inc., Redmond, WA (US)

( * ) Notice: Subject to any disclaimer, the term of this patent is extended or adjusted under 35 U.S.C. 154(b) by 324 days.

(21) Appl. No.: 10/061,359

(22) Filed: Feb. 4, 2002

(65) Prior Publication Data

US 2002/0161509 A1 Oct. 31, 2002

Related U.S. Application Data

(60) Provisional application No. 60/286,973, filed on Apr. 30, 2001.

(51) Int. Cl.
*G06F 17/60* (2006.01)

(52) U.S. Cl. .............................. 705/28; 705/22; 705/29

(58) Field of Classification Search ................ 705/28, 705/29, 22
See application file for complete search history.

(56) References Cited

U.S. PATENT DOCUMENTS

| | | | |
|---|---|---|---|
| 5,014,206 A | 5/1991 | Scribner et al. | |
| 5,315,508 A | * 5/1994 | Bain et al. | 705/28 |
| 5,712,789 A | 1/1998 | Radican | |
| 5,892,441 A | 4/1999 | Woolley et al. | |
| 6,138,072 A | * 10/2000 | Nagai | 701/207 |
| 6,142,372 A | 11/2000 | Wright | |
| 6,148,291 A | 11/2000 | Radican | |
| 6,205,396 B1 | 3/2001 | Teicher et al. | |
| 6,212,475 B1 | 4/2001 | France et al. | |
| 6,246,882 B1 | * 6/2001 | Lachance | 455/456.4 |
| 6,611,755 B1 | * 8/2003 | Coffee et al. | 701/213 |
| 2002/0032612 A1 | * 3/2002 | Williams et al. | 705/26 |

FOREIGN PATENT DOCUMENTS

JP 2002-569753 * 6/2002

OTHER PUBLICATIONS

MapInfo: MapInfo debuts MapInfo Professional, The premier client/server solution for desktop mapping applications; New intelligent client delivers built-in connectivity to remote corporate database. Business Wire. Oct. 30, 1995.*

* cited by examiner

*Primary Examiner*—James S. McClellan
(74) *Attorney, Agent, or Firm*—Nixon & Vanderhye P.C.

(57) ABSTRACT

A computerized method and system enables the location, usage status and department assignment of each of a plurality of trailers to be tracked at all times while each trailer is at a warehouse facility. A web browser-based graphical display is generated that identifies the current location, usage status and department assignment of each trailer. Information provided to the system is updated using computer terminals, rf scanners and other computerized systems that communicate with the tracking system.

28 Claims, 8 Drawing Sheets

SYSTEM AND METHOD FOR TRACKING TRAILERS

CROSS REFERENCE TO RELATED APPLICATION

This Application claims the benefit of U.S. Provisional Application No. 60/286,973 filed Apr. 30, 2001, the contents of which are incorporated herein by reference.

BACKGROUND AND SUMMARY

The technology described herein relates to a system and method of tracking carriers such as shipping trailers, and in particular to a system and method of tracking carriers from the time each carrier enters a warehouse facility to the time it exits the warehouse facility.

The traffic volume of a warehouse facility can be very heavy. Several trailers will often be on the premises of a warehouse facility at any given time. Difficulties will therefore arise in determining where each specific trailer is located within the facility, particularly since the trailers often move within the warehouse facility after being initially parked upon their respective arrivals. These difficulties are further complicated if the location of a trailer is not recorded which may occur, for example, when a trailer arrives after normal business hours or during the weekends.

In addition to difficulties regarding each trailer's location, other problems may arise if the usage status (i.e. how each trailer is being used or for what purpose it is being used) of each of the trailers is unrecorded and/or unknown. For example, it may be unknown which trailers are damaged or already fully loaded, and therefore not available to carry additional product(s). Considerable time and effort may thus be wasted in order to find an empty trailer to load products for shipment.

Furthermore, it may be unknown which, if any, of the trailers have been reserved by a particular department of the warehouse facility. That is, it may be unknown who is assigned to or responsible for a particular trailer. A department may thus mistakenly select and use a trailer that has been already reserved by another department.

While it may be possible to keep manual notes regarding the location, usage status and department assignment of a particular trailer, these notes may not be readily available to all of the personnel of the warehouse. Keeping manual notes may be difficult in view of the heavy traffic volume at the warehouse facility and because the location, usage status and department assignment of a particular trailer may change while it is on the warehouse facility. Furthermore, storage of the manual notes is unreliable. Manual notes may also contain errors in recording the identification number of a trailer, etc., thereby resulting in wasted time and effort and reduced production.

It would therefore be beneficial to provide a system and method of tracking trailers accurately at a warehouse facility beginning at or even before the time each trailer arrives at the warehouse facility to the time it leaves the facility. It would also be beneficial to store the tracking records so that an accurate audit trail can be generated.

In an exemplary implementation, a method of tracking carriers at a warehouse facility (and a system for performing the same) comprises collecting data relating to at least one of a location, usage status and department assignment of a plurality of carriers, providing the data to a computer system, and generating a web page using the data provided to the computer system. The web page graphically represents the at least one of the location, usage status and department assignment of each carrier, and is displayed on a terminal that is in communication with the computer system. A request to display the web page may be received by the computer system through an internet or intranet connection. The data relating to the at least one of a location, usage status and department assignment of the carriers may be provided to the computer system by a wireless rf signal, a terminal, or another computer system which processes the loading or unloading of items into or from the carriers.

The method may further comprise updating the collection of the data, providing the updated data to the computer system and dynamically changing the web page in response to the updated data. The data may be collected and updated from a time each carrier arrives at the warehouse facility to a time the carrier exits the warehouse facility. The data collected for each carrier may be stored. The web page may graphically represent the bay doors and yard slots of the warehouse facility and whether each of the bay doors and yard slots is occupied by one of the carriers. The web page may graphically represent the usage status and department assignment using color codes. The usage status may be at least one of the following: available, docked, loading, unloading, reserved, unavailable, unprocessed, outbound, pickup, inbound, history, and/or storage. The department assignment may be an assignment to one of the following departments of the warehouse facility: production, receiving, shipping and security.

Exemplary implementations may enable the location, usage status and department assignment of the trailers to be tracked at all times while each trailer is on the premises of the warehouse facility using a web browser based graphical display. The productivity of the warehouse facility can thus be enhanced by, for example, reducing trailer backlogs and allowing trailers to be found in less time. Exemplary implementations may also allow records of each trailer's stay at the facility to be stored so that an accurate audit trail can be created.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above advantages, as well as other advantages of exemplary nonlimiting illustrative implementations, will be more completely understood and appreciated by careful study of the following more detailed description of exemplary nonlimiting illustrative implementations taken in conjunction with the accompanying drawings, in which.

DETAILED DESCRIPTION OF THE EXEMPLARY NONLIMITING ILLUSTRATIVE IMPLEMENTATIONS

Figure 1:
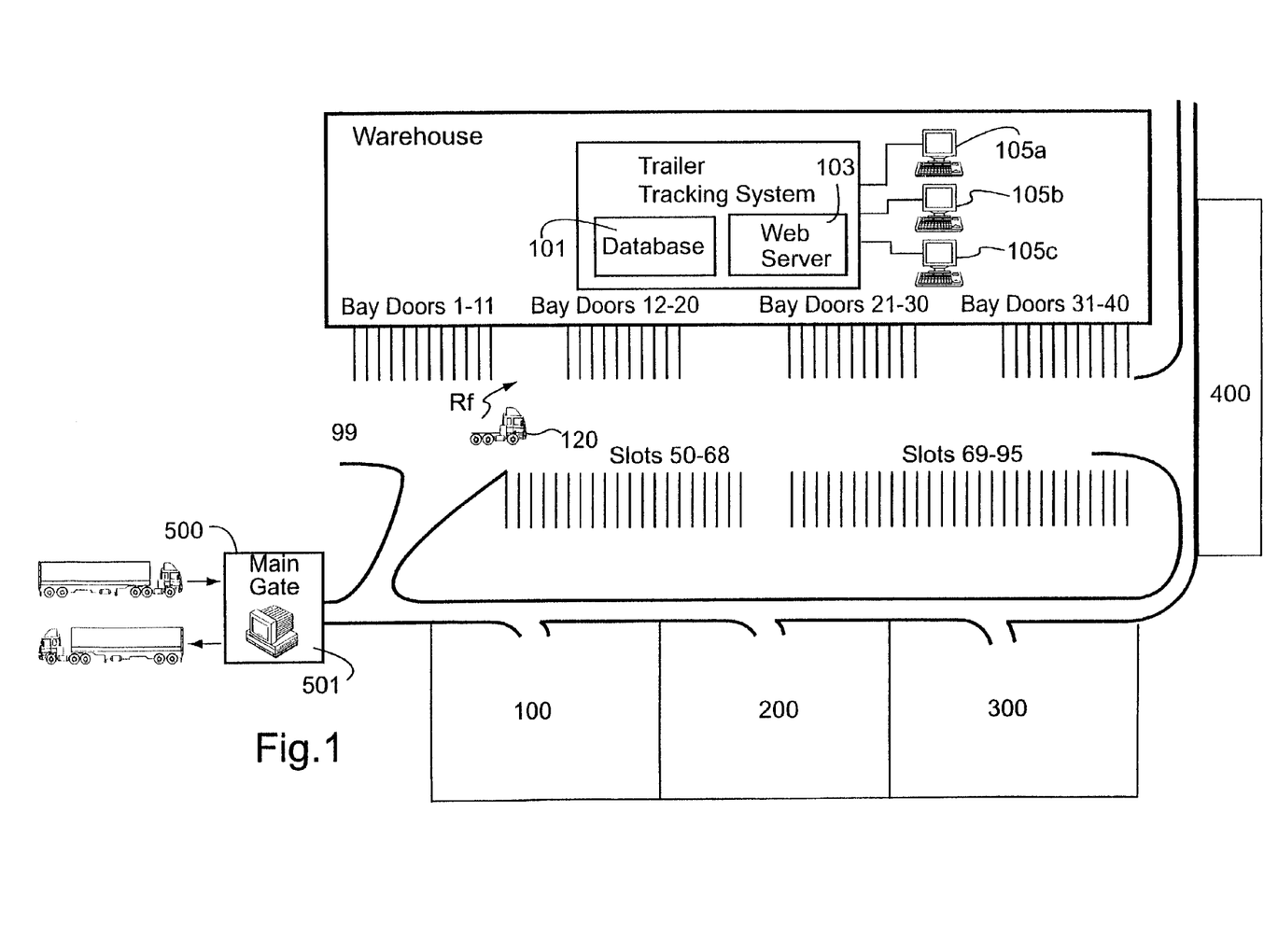
FIG. 1 is diagram of a warehouse facility having a trailer tracking system in accordance with an exemplary nonlimiting illustrative implementations.

FIG. 1 illustrates a warehouse facility including a computerized trailer tracking system in accordance with an nonlimiting illustrative implementations. The warehouse facility further includes forty bay doors 1–40, a trailer yard having forty-six yard slots 50–95 and five miscellaneous areas 99, 100, 200, 300, 400, and a main gate 500. Bay doors 1–20 are generally used (although not necessarily) for receiving and bay doors 21–40 are generally used (although not necessarily) for shipping. Each of the yard slots 50–95 is large enough to accommodate only one trailer. Miscellaneous areas 99, 100, 200, 300, 400 are large enough to accommodate multiple trailers and thus form areas for overflow parking.

The trailer tracking system includes a database 101 for storing information and a web server 103. The trailer tracking system interfaces with other computerized systems such as a computer-aided waving system for processing orders and an automated system for processing the loading and unloading of products into and out of each of the trailers. The trailer tracking system is operatively coupled to terminals 105a–105c and terminal 501 located in the main gate 500 as well as to a number of rf scanners (not explicitly shown) that transmit wireless data to the system.

FIGS. 2–8 illustrate various web pages of a web site that are generated by the trailer tracking system and accessible via the web server 103. The web pages of the web site are dynamically updated using data from another computer system interfaced to the trailer tracking system, the terminals 105a–105c, 501 or any of the rf scanners. The web pages are shown on a computer terminal (such as any of terminals 105a–105c, 501) via the web server 103 after receiving the appropriate address through an internet or intranet connection.

Figure 2:
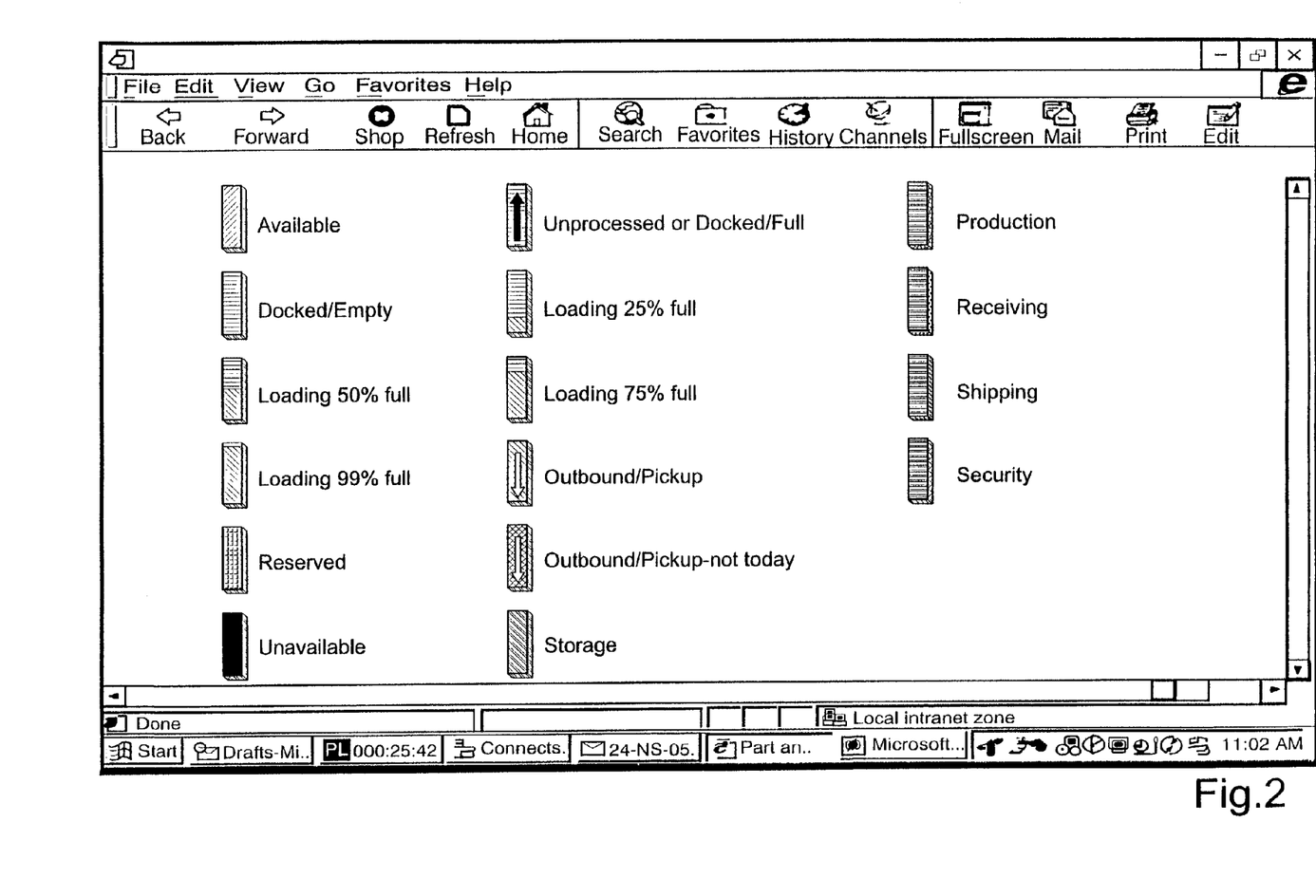
FIGS. 2–8 are various web pages of a web browser-based graphical display of the trailer tracking system and method in accordance with the exemplary nonlimiting illustrative implementations.

The web pages provide, inter alia, a graphical representation of the warehouse facility. As illustrated in FIGS. 3–8, each trailer's location within the warehouse facility is graphically represented by its position within the screen, and each trailer's usage status and department assignment (i.e., the department of the warehouse that has reserved or is responsible for the trailer) is represented by color codes and symbols such as directional arrows. As illustrated in FIG. 2, a web page of the web site that forms a key of definitions of the various color codes and symbols used to represent the usage statuses and department assignments can be accessed and displayed.

Figure 3:
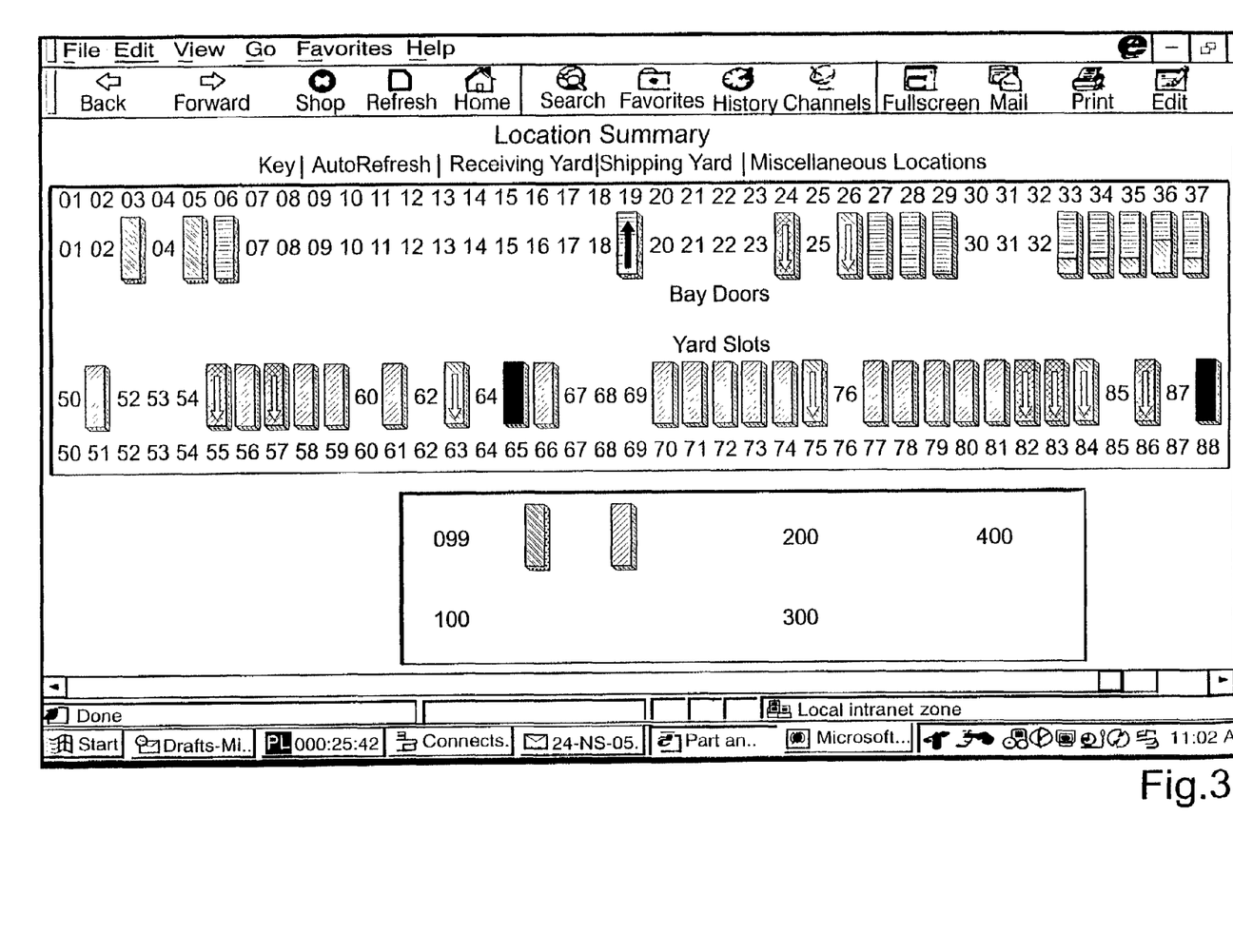
Figure 4:
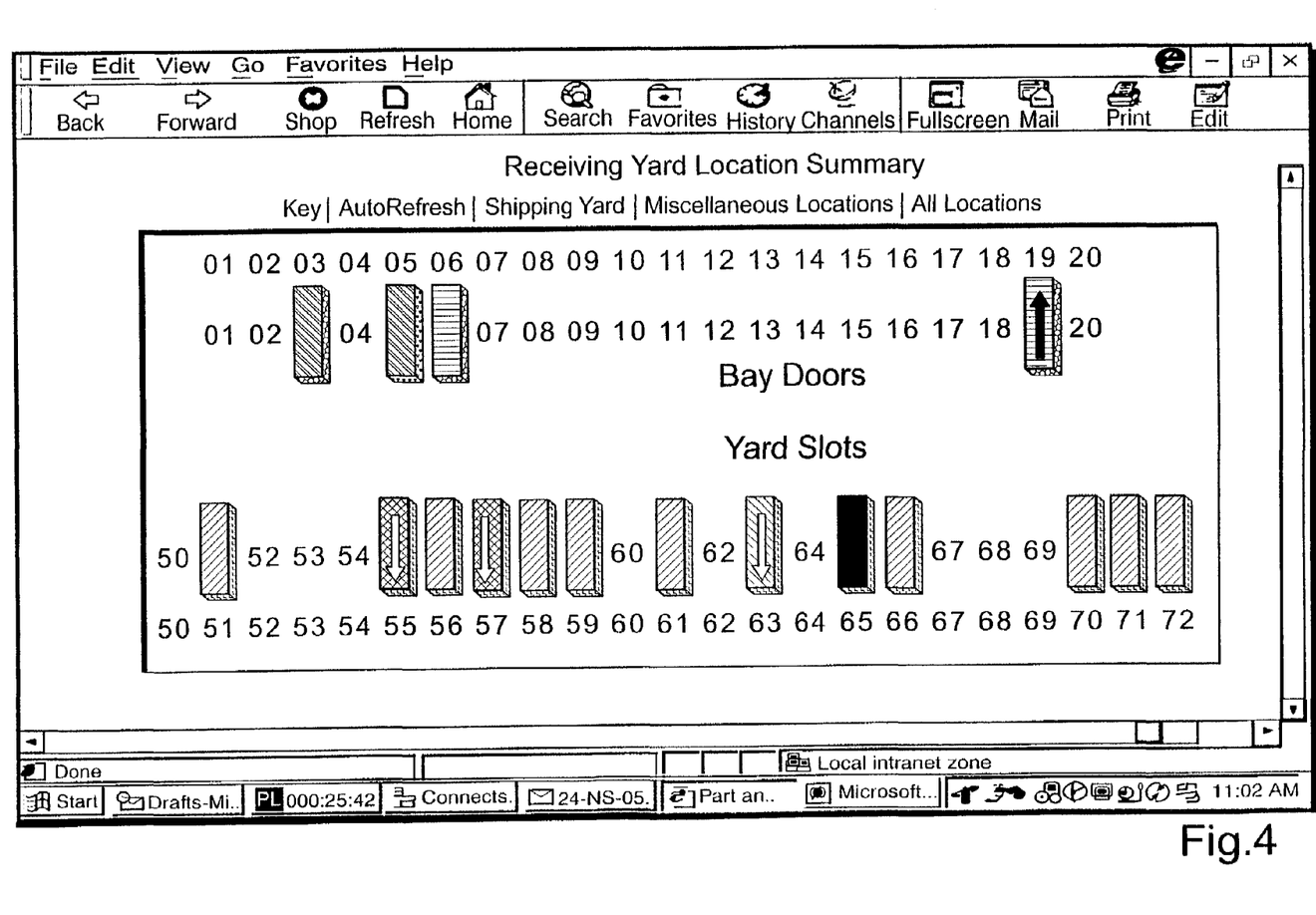
Figure 5:
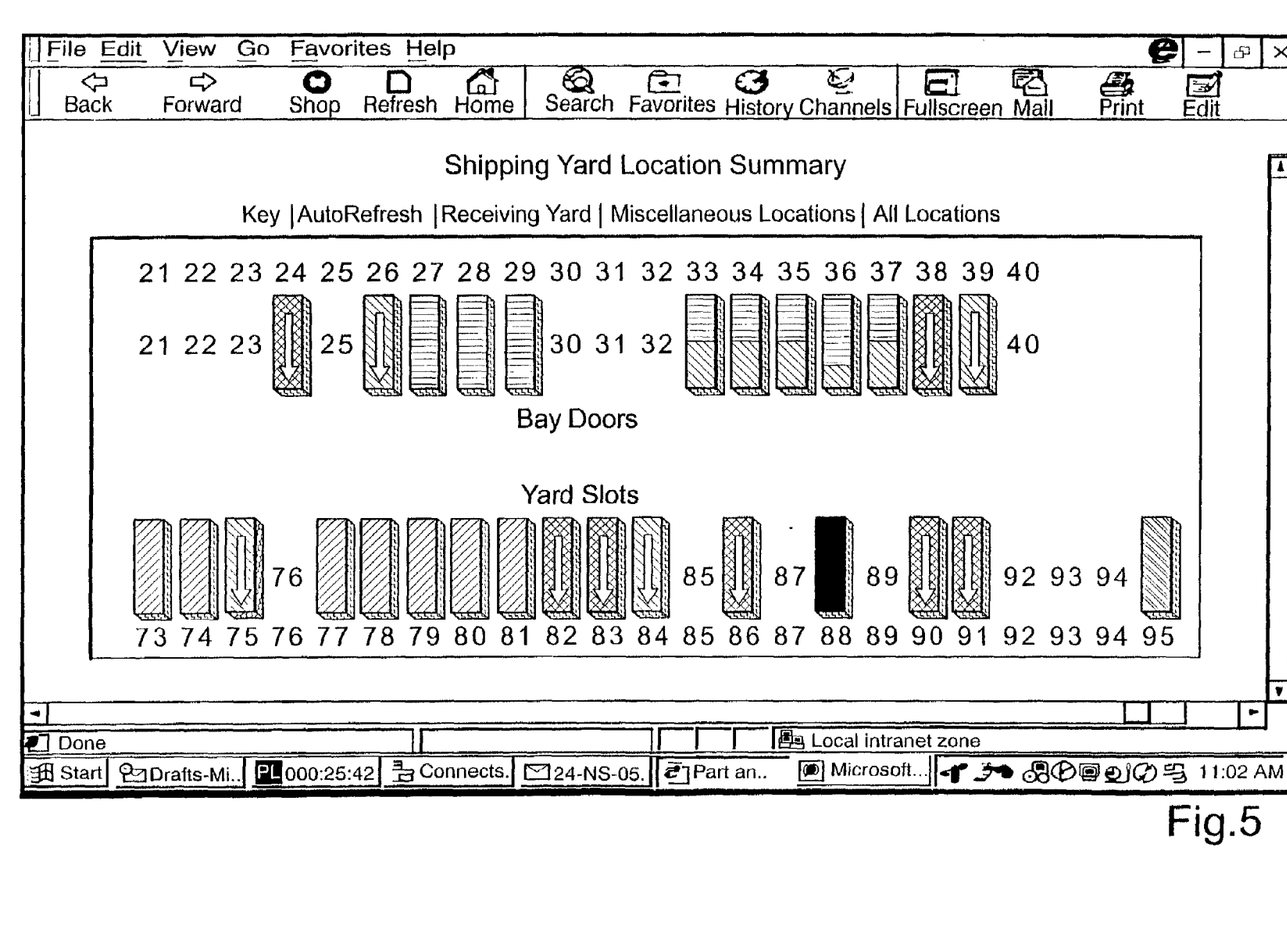
Figure 6:
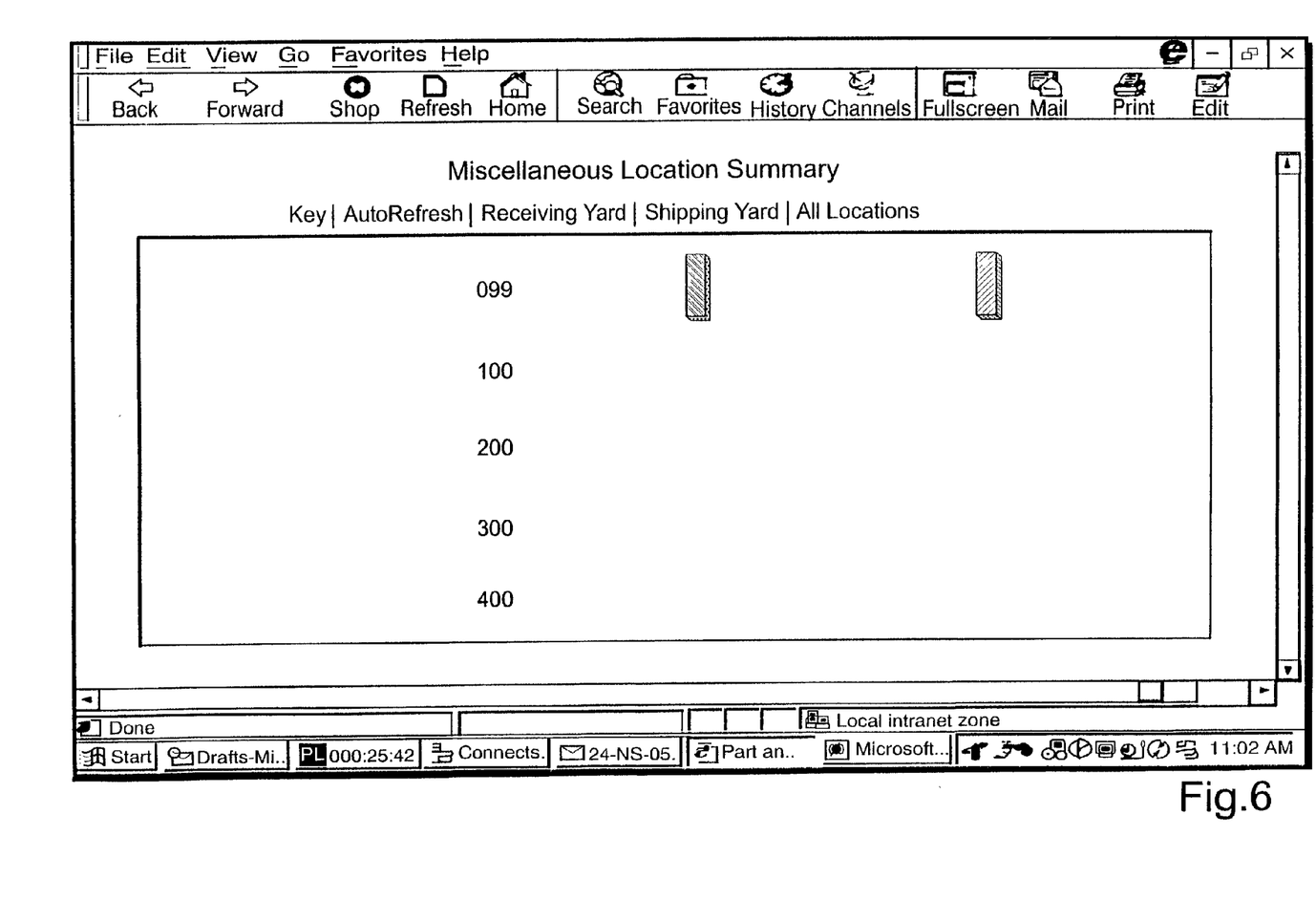

FIG. 3 shows a web page of the web site that graphically illustrates a location summary of the receiving yard, shipping yard and miscellaneous locations 99, 100, 200, 300, 400, and FIGS. 4, 5 and 6 illustrate enlarged screens of the receiving yard, shipping yard and miscellaneous locations, respectively. The screen illustrated in FIGS. 4, 5 and 6 can be displayed by selection of the appropriate link directly below the "Location Summary" label provided in the screen illustrated in FIG. 3. As shown in FIG. 3, each of the bay doors 1–40 of the warehouse facility is represented at the top of the web page with a corresponding number, each yard slot 50–95 is represented approximately in the middle of the web page with a corresponding number, and each of the miscellaneous areas 99, 100, 200, 300, 400 is represented at the bottom of the web page with a corresponding number. A rectangle in proximity to these numbers on the web page represents a trailer that is physically located at that particular bay door, or in that particular yard slot or miscellaneous area.

Each of the rectangles representing a trailer has a color on its right side that serves as a code for the department assignment of that trailer. The meaning of each (right side) color indicating a department assignment is shown in the key illustrated in the web page of FIG. 2. For example, a different (right side) color code can be used to indicate that a trailer has been assigned to one of the four following departments: production, receiving, shipping, or security. The "production" department is the department of the warehouse that manufactures products. The "receiving" department is the department of the warehouse that receives finished products. The "shipping" department is the department of the warehouse that ships finished products. The "security" department is the department that maintains the security of the warehouse. If a trailer is assigned to a particular department, another department will not be permitted to use it unless its assignment is overridden.

In addition to a color on its right side, each rectangle representing a trailer has a color and/or symbol (e.g., directional arrow) on its top side that serves as a code for the usage status of that trailer. The meaning of each color and/or symbol on the top side of each rectangle indicating a usage status is shown in the key illustrated in the web page of FIG. 2. For example, a different color code and or symbol can be used to indicate the following usage statuses: available, docked/empty, loading—N % full (where N is a number from 1–100), reserved, unavailable, unprocessed or docked/full, outbound/pickup, outbound/pickup-not today, storage inbound (not shown in FIG. 2), unloading—N % full (not shown in FIG. 2) and history (not shown in FIG. 2). The meaning of these statuses are as follows:

Available: An empty trailer that is available to be loaded. The trailer is either at some location other than a bay door, or it is a trailer at a bay door that was emptied and transferred to another department.

Docked: Trailer has been moved to a bay door, but has not started processing yet.

Load/Unload—N % Full: Trailer is located at a bay door and is currently being loaded or unloaded.

Reserved: Trailer has been reserved by a user or department.

Unavailable: Trailer cannot be used because it is damaged or otherwise unusable.

Unprocessed: A full trailer which needs to be emptied that is in the yard and not at a bay door.

Outbound: Trailer has been loaded or unloaded, but has not yet been moved from a bay door.

Pickup: Trailer is ready to leave, and has been moved from a bay door back into the yard.

Storage: Trailer is used for storage only and thus cannot be loaded or unloaded.

Inbound: Trailer is expected, but has not yet arrived.

History: The trailer has left the yard.

The trailer tracking system communicates with other computerized systems such as an automated processing system for loading/unloading products through an interface program. If a trailer is thus being loaded or unloaded at one of the bay doors, the automated processing system will automatically transmit data to the trailer tracking system reflecting what percentage of product has been loaded or unloaded. The trailer tracking system will automatically update the usage status "Loading—N % full" or "Unloading—N % full" by changing the value of N. The top colors of the rectangle representing the trailer being loaded or unloaded will dynamically change to reflect the changing value of N as illustrated in FIG. 2 which specifically illustrates examples of trailers that are 50% full, 99% full, 25% full and 75% full.

Figure 7:
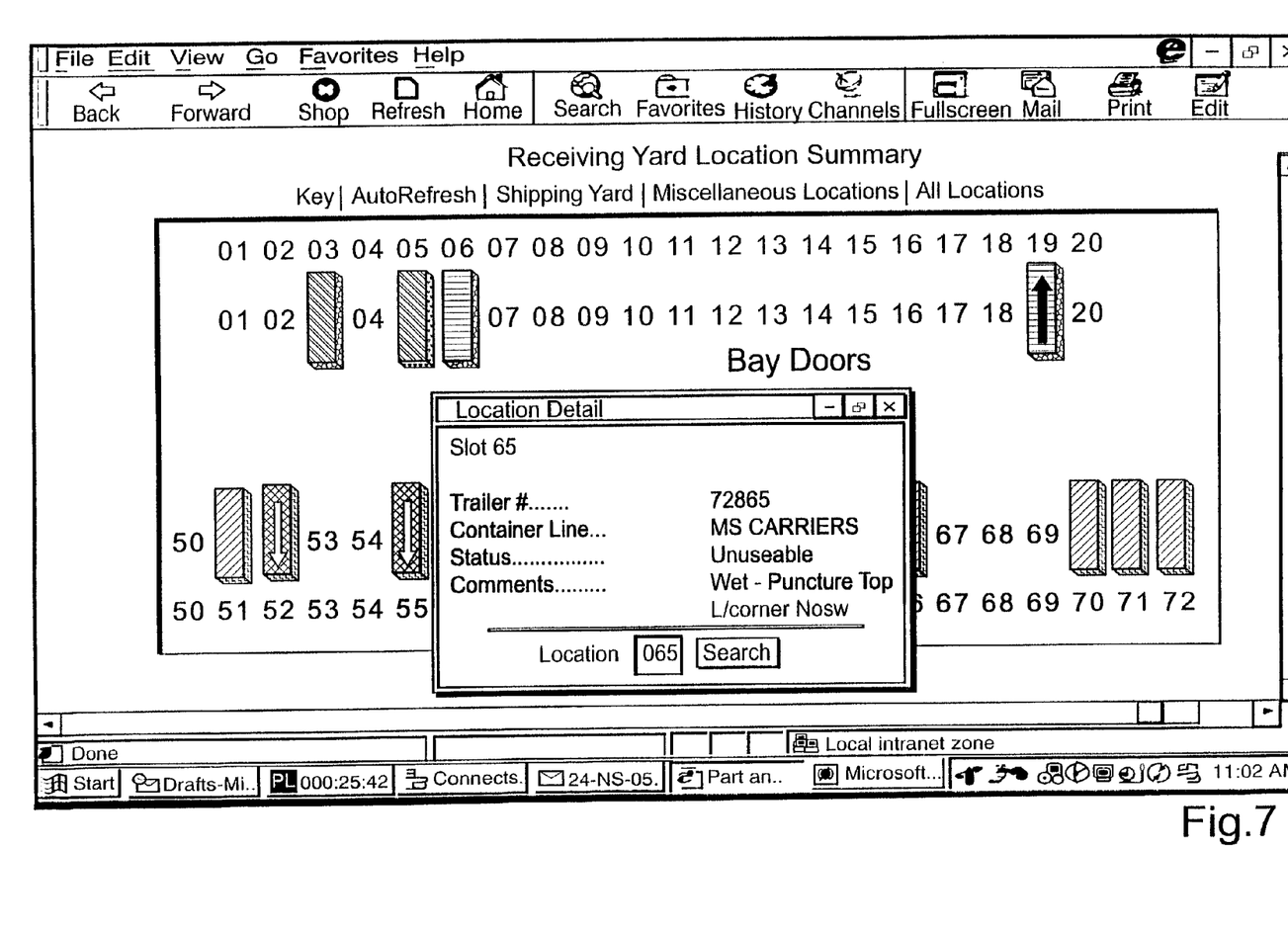
Figure 8:
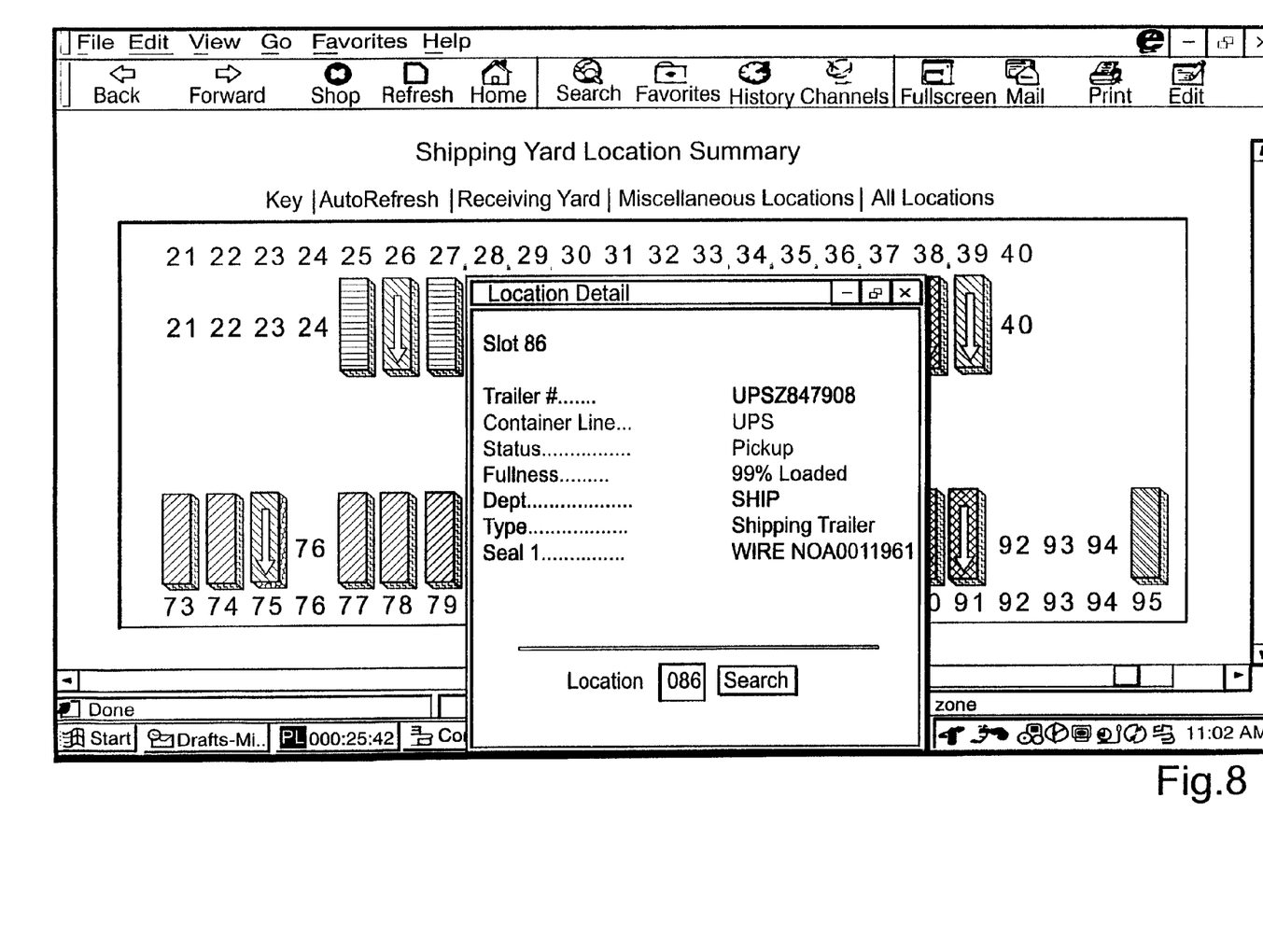

FIGS. 7 and 8 illustrate pages of the graphical display that provide detailed information on respective trailers. The pages illustrated in FIGS. 7 and 8 can be obtained by pointing and selecting a particular trailer using a mouse-directed cursor or inputting a specific location number. For example, if a user pointed to and selected the rectangle in yard slot 65 from the page illustrated in FIG. 3 or 4, then another page providing detailed information on the trailer in that slot would be displayed as illustrated in FIG. 7. Similarly, if a user selected or inputted the rectangle in yard slot 86 from the page illustrated in FIG. 3 or 5, then the detailed information on the trailer in that slot would be displayed as illustrated in FIG. 8. The detailed information includes, for example, trailer number, container line, status, comments (such as the reason the trailer is "unavailable" in FIG. 7), fullness, department, type, and any seal number.

After a trailer arrives at the main gate 500 or advance notice of a trailer's arrival at the warehouse facility is given to warehouse personnel, the trailer is logged into the trailer tracking system by assigning a unique identification number to the trailer along with its actual or expected arrival date. If an expected arrival date is assigned, then the trailer's actual arrival date will also be entered when it arrives. Other information such as department assignment and usage status is also input at the time or before the trailer's arrival at the main gate 500. If it is unknown to what department the trailer will ultimately be assigned, then the trailer will be assigned to the "security" department until the determination is made. The trailer tracking system receives the inputted information and is capable of providing and displaying information regarding what trailer(s) are expected or have arrived, when the trailer(s) are expected or have arrived, who is responsible for each trailer, and what each trailer's usage status is.

After a trailer has arrived, warehouse personnel can view an appropriate web page on terminal 501 to direct the trailer to either an appropriate bay door 1–40, yard slot 50–95, or miscellaneous areas 99, 100, 200, 300, 400. If the page(s) indicates that a specific bay door 1–40 or yard slot 50–95 is already occupied by a trailer, the trailer will, of course, be directed to an unoccupied bay door or yard slot or to a miscellaneous area. In contrast, even if the graphical display indicates that the miscellaneous areas 99, 100, 200, 300, 400 are already occupied by one or more trailers, the arrived trailer can still be directed to one of the miscellaneous areas as long as it has not reached its capacity limit.

The trailer driver then drives the trailer to the location designated by the warehouse personnel and typically leaves the trailer. Data reflecting the trailer's location may be transmitted by a hand-held rf scanner operated by the warehouse personnel or by an input on one of the terminals 105a–105c, 501 to the trailer tracking system. The system will dynamically update the web page to reflect the trailer's location.

Each trailer's (i) location, (ii) usage status and/or (iii) department assignment may change during its stay on the premises of the warehouse facility. For example, (i) a trailer may move between a yard slot and a bay door, (ii) a trailer may become full/empty or become unavailable due to physical damage, or (iii) after a receiving trailer is emptied by the receiving department, it may then be reassigned to the shipping department so it can be loaded with products for shipment. Data reflecting the changes in location, usage status and department assignment are input to the trailer tracking system through an rf scanner, a terminal 105a–105c, 501 or an interfaced processing system.

For example, if a driver of a hostler (a vehicle used to move the trailers within the warehouse facility) moves a trailer from a yard slot to a bay door, the driver can use an rf scanner to input (e.g., scan a bar code or punch a number on a keypad) the trailer's new location. The data reflecting the input will then be transmitted via a wireless rf signal to the trailer tracking system and the position of the rectangle representing the trailer will change in the web pages. Alternatively, the new location can be input using one of the terminals 105a–105c, 501. Once the trailer is docked at a bay door, loading or unloading of products will begin, thus changing how full/empty the trailer is. The computerized processing system for loading/unloading automatically transmits data to the trailer tracking system through an interface program, and the trailer tracking system changes the usage status (i.e., the top color of the rectangle represented the docked trailer) on the accessible web pages. The tracking of each trailer's location, usage status and department or type assignment continues until the trailer is logged out by the main gate 500 upon its exit from the warehouse facility. The records resulting from the tracking of each trailer are stored in the database 101.

As noted above, the changes in the location, usage status and department or type assignment are reflected in the web pages. Specifically, the positioning of the rectangle representing the trailer on the page, the top color and/or symbol of the rectangle and the right side color of the rectangle will change to reflect any change in the location, usage status and department assignment, respectively.

The exemplary implementations enable a web-browser based graphical display to be generated that provides accurate, current information of the location, usage status and department assignment of a trailer at all times while the trailer is on the premises of the warehouse facility. Trailer backlogs can thus be reduced and trailers found in an expedient fashion. The records of each trailer's stay at the facility may be reviewed during or after the trailer's stay.

It is to be understood that the invention is not to be limited to the above disclosed exemplary implementations, but on the contrary, is intended to cover various modifications and equivalent arrangements included within the spirit and scope of the appended claims. For example, while the above discussion of the present relates to tracking trailers, it will be appreciated that the present invention can be applied to any other carrier.

What is claimed is:

1. A method of tracking carriers at a warehouse facility comprising:
    collecting data relating to usage status of a plurality of carriers;
    providing the data to a computer system; and
    generating a screen display using the data provided to the computer system, the screen display including a display of a user selectable icon graphically representing one of the carriers, the user selectable icon including at least a graphical portion which represents the usage status of the carrier represented by the user selectable icon and is dynamically changeable in response to updated data provided to the computer system relating to the usage status of the carrier represented by the user selectable icon;
    wherein data relating to a department assignment of the carriers is collected and provided to the computer system, and the user selectable icon graphically representing the one of the carriers further includes another graphical portion which represents the department assignment of the carrier represented by the user selectable icon and is dynamically changeable in response to collected updated data relating to the department assignment of the carrier represented by the user selectable icon.

2. The method of claim 1 wherein a request to display the screen display is received by the computer system through one of an internet and intranet connection.

3. The method of claim 1 wherein the data is provided to the computer system by a wireless rf signal.

4. The method of claim 1 wherein the data is provided to the computer system by a second computer system which processes data relating to loading or unloading of items into or from the carriers, the loading and unloading of items into or from the one of the carriers being reflected by the dynamically changeable graphical portion of the user selectable icon representing the usage status of the carrier.

5. The method of claim 1 wherein the data is collected and updated from a time each of the carriers arrives at the warehouse facility to a time that each of the carriers exits the warehouse facility.

6. The method of claim 1 further comprising storing the data collected for each of the carriers.

7. The method of claim 1 wherein data relating to the occupation of a bay door or a yard slot of the warehouse facility by one of the carriers is collected and provided to the computer system, and the screen display graphically represents bay doors and yard slots of the warehouse facility and dynamically and graphically represents whether each of the bay doors and yard slots is occupied by one of the carriers.

8. The method of claim 1 wherein the graphical portions of the user selectable icon represent the usage status and department assignment of the carrier represented by the user selectable icon using respective color codes.

9. The method of claim 1 wherein the usage status is at least one of the following: available, docked, loading, unloading, reserved, unavailable, unprocessed, outbound, pickup, inbound, history, full, empty and storage.

10. The method of claim 1 wherein the department assignment is an assignment to one of the following departments of the warehouse facility: production, receiving, shipping and security.

11. A method of claim 1 further comprising:
receiving a selection of the user selectable icon;
generating a display of detailed information relating to the carrier represented by the selected user selectable icon.

12. A method of claim 1 wherein data relating to a location of the carrier represented by the user selectable icon is collected and provided to the computer system and the user selectable icon representing the carrier has a position within the screen display which graphically represents the location of the carrier within the warehouse facility, the position of the user selectable icon within the screen display being dynamically changeable to reflect updated data provided to the computer system relating to the location of the carrier within the warehouse facility.

13. A method of claim 1 wherein data relating to a location of the carrier represented by the user selectable icon is collected and provided to the computer system and the user selectable icon representing the carrier has a position within the screen display which graphically represents the location of the carrier within the warehouse facility, the position of the user selectable icon within the screen display being dynamically changeable to reflect updated data provided to the computer system relating to the location of the carrier within the warehouse facility.

14. A system for tracking carriers at a warehouse facility comprising:
a computer system for generating a screen display; and
at least one data source for providing data relating to usage status of each of a plurality of carriers to the computer system so that the screen display generated by the computer system graphically represents the usage status of each of the carriers, the screen display including user selectable icons graphically representing respective carriers, each of the user selectable icons including at least a graphical portion which represents the usage status of the carrier represented by that user selectable icon and is dynamically changeable in response to updated data provided to the computer system relating to the usage status of the carrier represented by that user selectable icon;
wherein data relating to a department assignment of each of the carriers is provided to the computer system, and each of the user selectable icons graphically representing a respective one of the carriers further includes another graphical portion which represents the department assignment of the carrier represented by that user selectable icon and is dynamically changeable in response to updated data provided to the computer system relating to the department assignment of carrier represented by that user selectable icon.

15. The system of claim 14 wherein the computer system is capable of communicating through one of an internet or intranet connection.

16. The system of claim 14 wherein the at least one data source comprises an rf scanner for providing the data to the computer system by a wireless rf signal.

17. The system of claim 14 wherein the at least one data source comprises a second computer system which processes data relating to the loading or unloading of items into or from the carriers and, the loading and unloading of items into or from the carriers being reflected by the dynamically changeable graphical portions of the user selectable icons respectively representing the usage status of the carriers.

18. The system of claim 14 wherein the at least one data source is capable of collecting and providing updated data from a time each of the carriers arrives at the warehouse facility to a time each of the carriers exits the warehouse facility.

19. The system of claim 14 wherein the computer system comprises a database for storing the data collected for each of the carriers.

20. The system of claim 14 wherein data relating to the occupation of a bay door or a yard slot of the warehouse facility by one of the carriers collected and provided to the computer system, and the screen display graphically represents bay doors and yard slots of the warehouse facility and dynamically and graphically represents whether each of the bay doors and yard slots is occupied by one of the carriers through proximate positioning of one of the user selectable icons.

21. The system of claim 14 wherein the graphical portions of each of the user selectable icons respectively represent the usage status and department assignment of the carrier represented by that icon using respective color codes.

22. The system of claim 14 wherein the usage status is at least one of the following: available, docked, loading, unloading, reserved, unavailable, unprocessed, outbound, pickup, inbound, history, full, empty and storage.

23. The system of claim 14 wherein the department assignment is an assignment to one of the following departments of the warehouse facility: production, receiving, shipping and security.

24. A system of claim 14 wherein the computer system receives a selection of one of the user selectable icons and generates a display of detailed information relating to the carrier represented by the selected user selectable icon.

25. A system of claim 14 wherein data relating to a location of each of the carriers is provided to the computer system and the user selectable icons respectively representing the carriers have respective positions within the screen display which graphically represent the locations of the carriers within the warehouse facility, the positions of the user selectable icons within the screen display being dynamically changeable to represent updated data provided to the computer system relating to the locations of the carriers within the warehouse facility.

26. A system of claim 14 wherein data relating to a location of each of the carriers is provided to the computer system and the user selectable icons respectively representing the carriers have respective positions within the screen display which graphically represent the locations of the carriers within the warehouse facility, the positions of the user selectable icons within the screen display being dynamically changeable to represent updated data provided to the computer system relating to the locations of the carriers within the warehouse facility.

27. A method of tracking carriers at a warehouse facility comprising:
   collecting data relating to a changeable characteristic of each of a plurality of carriers;
   providing the data to a computer system; and
   generating a screen display using the data provided to the computer system, the screen display including at least one user selectable icon graphically representing one of the carriers, the user selectable icon including at least a graphical portion which represents the changeable characteristic of the carrier represented by the user selectable icon with a certain appearance that dynamically changes to another appearance in response to updated data provided to the computer system relating to the changeable characteristic of the carrier represented by the user selectable icon;
   wherein the user selectable icon includes another graphical portion which represents another changeable characteristic of the carrier represented by the user selectable icon with a certain appearance that dynamically changes to another appearance in response to updated data provided to the computer system relating to the another changeable characteristic of the carrier.

28. A system for tracking carriers at a warehouse facility comprising:
   a computer system for generating a screen display; and
   at least one data source for providing data relating to a changeable characteristic of at least one of the plurality of carriers to the computer system so that a screen display generated by the computer system includes a user selectable icon graphically representing the at least one carrier, the user selectable icon including at least a graphical portion which represents the changeable characteristic of the carrier represented by the user selectable icon with a certain appearance that dynamically changes to another appearance in response to updated data provided to the computer system relating to the changeable characteristic of the carrier represented by the user selectable icon;
   wherein the user selectable icon includes another graphical portion which represents another changeable characteristic of the carrier represented by the user selectable icon with a certain appearance that dynamically changes to another appearance in response to updated data provided to the computer system relating to the another changeable characteristic of the carrier.

* * * * *